(12) United States Patent
Murray

(10) Patent No.: US 11,961,082 B2
(45) Date of Patent: *Apr. 16, 2024

(54) SYSTEM AND METHOD OF PROVIDING PROXIMITY PAYMENTS

(71) Applicant: 423 Enterprises, LLC, Arlington, VA (US)

(72) Inventor: Patrick L. Murray, Arlington, VA (US)

(73) Assignee: 423 Enterprises, LLC, Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/157,500

(22) Filed: Jan. 20, 2023

(65) Prior Publication Data

US 2023/0153817 A1 May 18, 2023

Related U.S. Application Data

(63) Continuation of application No. 17/000,151, filed on Aug. 21, 2020, now Pat. No. 11,580,546.
(Continued)

(51) Int. Cl.
*G06Q 20/40* (2012.01)
*G06Q 10/105* (2023.01)
(Continued)

(52) U.S. Cl.
CPC ....... *G06Q 20/4015* (2020.05); *G06Q 20/085* (2013.01); *G06Q 20/3224* (2013.01);
(Continued)

(58) Field of Classification Search
None
See application file for complete search history.

(56) References Cited

U.S. PATENT DOCUMENTS

| 10,339,746 | B1 | 7/2019 | Rolf |  |
| 2010/0078471 | A1* | 4/2010 | Lin | G06Q 40/02 |
|  |  |  |  | 235/379 |

(Continued)

OTHER PUBLICATIONS

Young, Cheri A., David L. Corsun, and Karen L. Xie. "Travelers' preferences for peer-to-peer (P2P) accommodations and hotels." International Journal of Culture, Tourism and Hospitality Research 11.4 (2017): 465-482 (Year: 2017).*

(Continued)

*Primary Examiner* — David P Sharvin
*Assistant Examiner* — Brock E Turk

(57) ABSTRACT

Methods and apparatus consistent with the present disclosure allow a customer or payor to select from a plurality of nearby vendors or payees when a computing device of the payor is physically close to electronic devices of the payees. Payee devices and locations of those payee devices may be identified and displayed on a display of a payor device. Once displayed, a specific payee device may be selected by the customer and an order for a product or service may be sent to the selected payee device from the payor device. After the product or service has been provided to the customer, information that confirms that purchase may be sent to any of the selected payee device, the payor device, or a payment processing computer and funds to pay for the product or service may be deposited into an account of the payee based on the confirmation.

20 Claims, 5 Drawing Sheets

Related U.S. Application Data

(60) Provisional application No. 62/891,421, filed on Aug. 25, 2019.

(51) Int. Cl.
| | |
|---|---|
| *G06Q 20/08* | (2012.01) |
| *G06Q 20/32* | (2012.01) |
| *G06Q 30/018* | (2023.01) |
| *G06Q 30/0279* | (2023.01) |
| *G06Q 30/0601* | (2023.01) |
| *H04W 4/02* | (2018.01) |
| *H04W 12/63* | (2021.01) |

(52) U.S. Cl.
CPC ....... *G06Q 20/327* (2013.01); *G06Q 30/0637* (2013.01); *H04W 4/023* (2013.01); *H04W 12/63* (2021.01); *G06Q 10/105* (2013.01); *G06Q 30/0185* (2013.01); *G06Q 30/0279* (2013.01)

(56) References Cited

U.S. PATENT DOCUMENTS

| | | | |
|---|---|---|---|
| 2011/0066550 A1* | 3/2011 | Shank | G06Q 20/1085 |
| | | | 701/469 |
| 2013/0006847 A1 | 1/2013 | Hammad et al. | |
| 2015/0058125 A1* | 2/2015 | Moshfeghi | G06Q 20/3224 |
| | | | 705/14.58 |
| 2016/0253654 A1 | 9/2016 | Rolf | |

OTHER PUBLICATIONS

Shobha, Nahar Sunny Suresh, et al., "NFC and NFC payments: A review." 2016 International Conference on ICT in Business Industry & Government (ICTBIG). IEEE (Year: 2016).

\* cited by examiner

SYSTEM AND METHOD OF PROVIDING PROXIMITY PAYMENTS

PRIORITY INFORMATION

The present application is a continuation of U.S. patent application Ser. No. 17/000,151, filed Aug. 21, 2020, now U.S. Pat. No. 11,580,546, issued Feb. 14, 2023, which claims the priority of U.S. Provisional Application No. 62/891,421, filed Aug. 25, 2019, the contents of which is incorporated herein in its entirety.

BACKGROUND OF THE INVENTION

Field of the Invention

The present disclosure generally relates to mobile payments. More particularly, the present disclosure is directed to processing payments electronically based on proximity between user devices and the identification of potential payees.

Description of the Related Art

As individuals depend less and less on cash for the purchase of goods and services, a shift that has accelerated given the recent need for social distancing, certain service providers that commonly receive small cash gratuities, donations, and payments and their customers may not be well positioned to benefit from this increasingly cashless society. For example, those receiving the benefit of services from service providers may desire to provide gratuities, but lack any payment medium except for a credit card, debit card, or other such electronic cashless payment method. Furthermore, those providing such services may have significant barriers to receiving cashless payments. Examples of such barriers include a lack of access to credit card terminals and desire to avoid credit card transaction fees. Credit card terminals can be expensive to purchase and maintain. Transactions on other mobile payment providers can present different barriers given the dependence on the exchange and input of personal information (i.e.: phone number, email address, banking information, or other user identifier). These barriers vastly increase the length of time to execute a transaction as compared to cash exchanges, making the possibility of a cashless exchange impractical or less likely to occur. Furthermore, the exchange of personal information is not conducive to the exchange of low value gratuities, donations, and payments as the additional time required to exchange and input information into a mobile payment platform may not be convenient when customers are in a hurry. As such, the recording of personal information frequently required when cashless transactions are performed may result in a reduction in the receipt of gratuities or donations to service providers as compared to instances when the historically and culturally important quick exchange of a small amount of cash is used to perform such transactions. Moreover, payors (or payers) of such gratuities, donations, and payments are not searching for continued engagement with the payee and vice versa, leading to a reduced desire to allocate the time necessary to exchange personal information for purposes of such cashless exchanges.

SUMMARY

What is needed in the art is a mobile payment mechanism that allows for the transfer of funds to a person with no prior relationship to the payor and no expectation of a future relationship with the payor. A method and apparatus are disclosed that do not required the exchange of personal information when gratuity or donation payments are made in an increasingly cashless world. The devices of the payor and payee are determined to be in proximity to each other and disclosed herein are various ways of implementing user interfaces and the processing of payments or a transfer of value from one device to the other.

The present disclosure is directed to a method, a non-transitory computer-readable storage medium, and an apparatus for processing orders and payments electronically. In a first embodiment, a method may include processing data received from a plurality of user devices, identifying one or more of those user devices that are within a threshold proximity distance of a payor device, receiving a selection of a payee device from the one or more user devices, and authorizing payment from an account associated with the payor device to pay for ordered products or services. The payment can be made in a peer-to-peer fashion between the payor device and the other device.

In a second embodiment, the method may be implemented by a non-transitory computer-readable storage medium, where a processor executes instructions that implement the method. Here again the method include processing data received from a plurality of user devices, identifying one or more of those user devices that are within a threshold proximity distance of a payor device, receiving a selection of a payee device from the one or more user devices, and authorizing payment from an account associated with the payor device to pay for ordered products or services.

A third embodiment of the presently claimed invention may be an apparatus that includes a memory and a processor that executes instructions out of the memory to processing data received from a plurality of user devices, identify one or more of those user devices that are within a threshold proximity distance of a payor device, receive a selection of a payee device from the one or more user devices, and may authorize payment from an account associated with the payor device to pay for ordered products or services.

DETAILED DESCRIPTION

Figure 1:
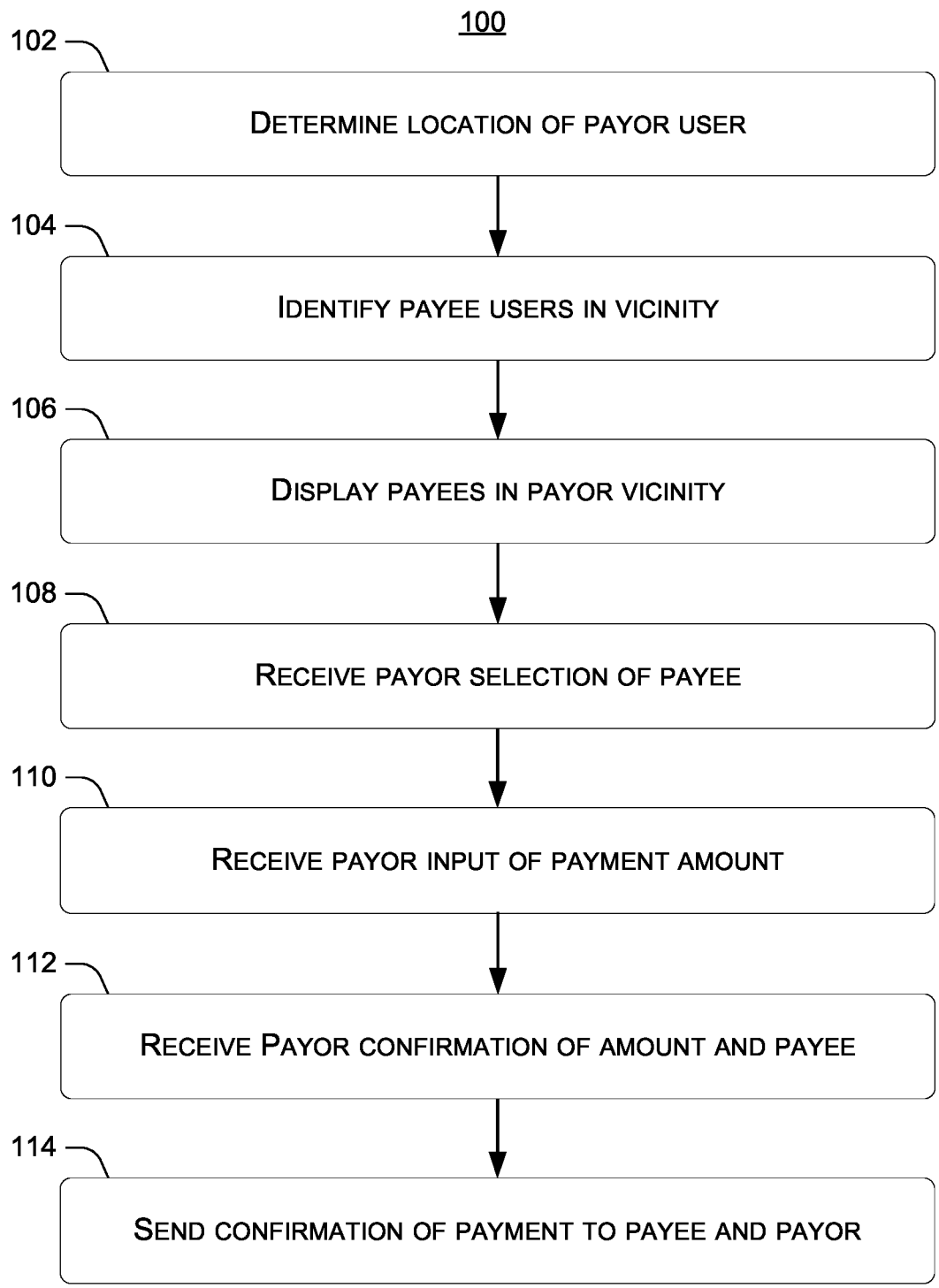
FIG. 1 illustrates a method according to one embodiment for determining payees and processing payment from payor to selected payees.

Methods and apparatus consistent with the present disclosure allow a customer or payor to select from a plurality of nearby vendors or payees when a computing device of the payor is physically close to electronic devices of the payees. As an example, physically close or a threshold distance can be within 10 feet or 25 feet. The distance can be determined based on any number of modalities such as sound, signals such as BlueTooth or Wi-Fi signals. Payee devices and locations of those payee devices may be identified and displayed on a display of a payor device. Once displayed, a specific payee device may be selected by the customer or payor and an order for a product or service may be sent to the selected payee device from the payor device. After the product or service has been provided to the customer or payor, information that confirms that purchase may be sent to any of the selected payee device, the payor device, or a payment-processing computer and funds to pay for the product or service may be deposited into an account of the payee based on the confirmation.

Services like Apple Pay, Google Pay, cryptocurrencies, PayPal, a peer-to-peer payment system, or other payment method can be utilized to accomplish the actual payment process once the payor and the payee are identified.

The present disclosure provides a system and method for determining a possible payee device within the general vicinity of a payor device. When the payor is ready to make a payment, such as when a payor may desire to tip a waiter, a payment provider can be notified, which can then determine a current location of the payor device. The payment provider may be a network-based payment service or may be an application operating on the payor device that is activated. Other users in the general vicinity of the payor device can be identified by comparing the location of other user devices with the location of the payor device, such as by way of GPS positions associated with each of the users. Any mechanism can be deployed to determine the proximity of devices to each other. Those user devices in the general vicinity of the payor device can be displayed on the payor device to provide the payor with the ability to select a particular user.

In one embodiment, the payees can be displayed on the payor device in order of proximity to the payor device, such as from nearest to furthest. However, in alternative embodiments, the order for displaying of the other user devices can be based on other criteria, such as number of prior interactions between a payor and a particular payee, or an associated "popularity" of a particular payee based on prior payments received from other payors, among other ranking criteria. In another example, a waiter can have a particular application that individuals who receive tips might have downloaded. A potential payee device with that application or functionality set might be presented in a priority manner or as part of a list. Such ranking criteria may be set by one or more settings at a user device. Thus, in a restaurant for example, while there might be 20 mobile devices within the proximity of a person at the restaurant desiring to leave a tip, only the phones with a respective payment application may show up as within a threshold distance of a payor device. The payor device may also have a setting or an application running that only lists neighboring devices with the application for receiving a payment.

Information that identifies payee devices can be displayed on the payor's device by way of a user interface with a photo, user name, or other identifier. The payor can then select a desired payee. Once a payee is selected, the payor can be prompted to select a payment amount. The payor can then enter the desired amount and submit the payment. The payor then can confirm the payee and amount, such as by responding to a confirmation sent to the payor device from the payment provider. Upon approval of the transaction, the payment provider can then transmit the payment from the payors account to the payee's account. A confirmation can be sent to both payor device and payee device in the form of an email, text message, push notification, or other such notification. Such transactions may be made directly between a payor device and a payee device or a network-based server may interact with a payor device and potentially with a payee device to perform a transaction. Such a server may even provide a menu or list of items for sale to a payor device. As such, different embodiments may rely almost entirely on a server interacting with a payor device, a server may be configured to only perform some actions (e.g. making a payment), or a server may not participate in this process at all.

In one aspect, details about a separate transaction such as the purchase of a meal can be provided to the payor device such that they can pay the entire bill or perhaps have a suggested tip amount presented to them in selecting the payment amount. The payee device (waiter's mobile phone) may have the capabilities of coordinating meal data and that data can be made available to the communications between the payor and the payee devices.

Thus, instead of requiring the payor to enter information such as an email, user name, phone number, or other unique identifier, the payor can be presented with a list of potential payees determined by the proximity of those payee devices to the payor device. A user device, such as a mobile phone, tablet computer, smart watch, or other computing device may be configured to provide or receive cashless payments after an application program has been downloaded and initiated at the user device. Such application programs may be available for download from a program application store, such as the Apple APP store. In another aspect, the system can enable the user to use a browser for accessing a URL (uniform resource locator) to access a particular server, which can deliver data and a user interface to enable a payment to another device.

FIG. 1 illustrates a method 100 according to one embodiment for determining payees and processing a payment to selected payees. At step 102, a payor has selected an application program on a device, such as a mobile phone, tablet, smart watch, or other device. In doing so, the payment provider can determine the location of the payor device. In one embodiment, the location of payor and payee devices can be determined using functionality associated with the devices, such as a GPS, whereby a device transmits the current GPS coordinates of the device to the payment provider. Other embodiments may employ the payor and payee devices' other capabilities for determining location or recognizing other devices in the vicinity, such as by way of Bluetooth or other low power short distance communication interface. Once the location of the device has been identified, the payment provider can determine other devices in the vicinity of the payor device, at step 104. In instances when low power communication interfaces are used to identify payees devices, that payor device may receive signals that have a signal strength or signal quality above a threshold level. Payee devices beyond a certain proximal distance may not be capable of communicating with payor devices when those payee devices are simply out of an effective communication range with a payor device. The steps illustrated in FIG. 1 may be performed by a payor device that receives payee device information from the payee user devices illustrated in FIG. 2.

Figure 2:
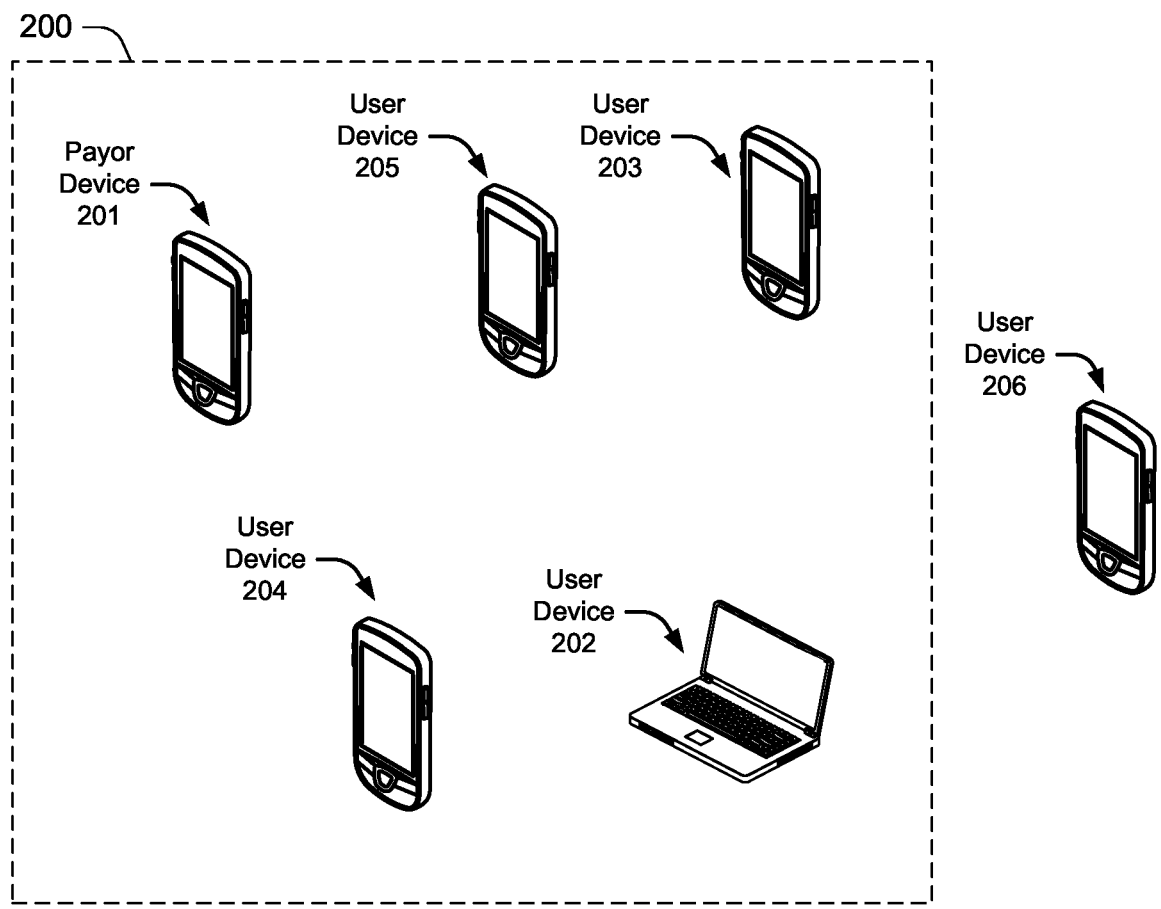
FIG. 2 is an example graphical representation of discovered payee devices in the immediate vicinity of a payor device.

FIG. 2 is an example graphical representation of discovered payee devices in the immediate vicinity of a payor device. FIG. 2 includes a proximity area 200 that represents an area around payor device 201 and a plurality of user devices 202-206. Each of the payee devices 202-206 are within a relative or threshold distance from payor device 201. User device 202 of FIG. 2 may be closest in proximity to payor device 201, followed by user device 203, then user device 204, and then user device 205. Moreover, user device 206 may be located outside proximity area 200. However, it is to be appreciated that not all of user devices 202-206 may be devices that are configured to use the disclosed payment system, and therefore while such devices may be within a proximity of payor device 201, these devices may not be considered as potential payees.

Proximity area 200 can be determined by the payment provider and, in some embodiments, may consist of a radius or other such defined area around the payor device. In another embodiment, the vicinity may be determined by the user, such as by defining a distance threshold, where a user may select from a set of potential radii for the purpose of expanding or constricting the area included in the vicinity as a means of expanding or restricting the number of identified users. Alternatively, a user may enter a defined threshold distance value for providing to the payment provider.

Furthermore, in some embodiments, the payment provider may determine whether certain user devices are in a mode that enables the processing of payments. For example, certain user devices may be configured to be in a "receive" mode that allows for the receipt of payments, while other user devices may be set to a "default" mode that only allows for the submission of payments. As such, even if certain devices are within proximity area 200, they may not be included in the list of proximate devices if their mode is not set to receive payments.

Referring again to FIG. 1, once the potential payees are determined by the payment provider to be located within the vicinity of the payor device, at step 106, those users can receive orders based on proximity to the payor device. Once identified, each respective payee device may be displayed on the display of payor device 201 as illustrated in FIG. 3.

Figure 3:
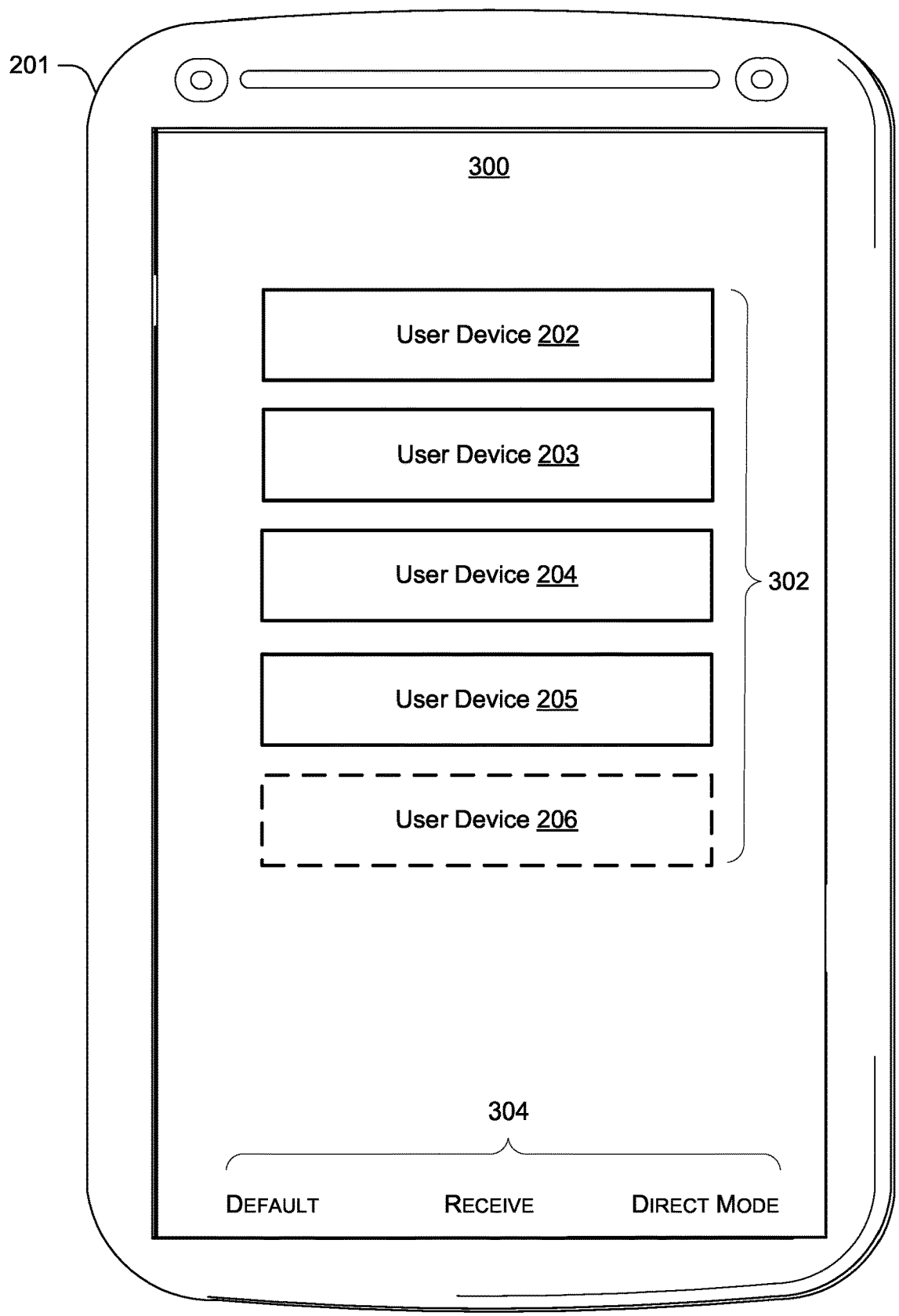
FIG. 3 is a diagram illustrating a payor device and discovered payee devices in the immediate vicinity according to one embodiment.

FIG. 3 is a diagram illustrating a payor device and discovered payee devices in the immediate vicinity according to one embodiment. FIG. 3 depicts an example partial display 300 of payor device 201 displaying a visual representation of the proximity of a plurality of user devices 302 in the vicinity of payor device 201, in accordance with the example proximity area 200 depicted in FIG. 2. As shown in FIG. 3, user devices 202, 203, 204, and 205 are listed in descending order, based on their relative distances from payor device 201. Furthermore, in some embodiments, user devices that may be within a threshold distance outside of proximity area 200 may also be displayed on display 300. For example, user device 206, as depicted in FIG. 2, falls outside of proximity area 200, but may be included in display 300 based on user device 206 being within a threshold distance of proximity area 200 (e.g. within a total distance that includes a proximal distance plus a threshold distance). In such an instance, devices that are outside of proximity area 200 may be visually depicted differently from user devices that are within proximity area 200, such as by utilizing dashed lines, as shown surrounding user device 206 in FIG. 3. Presented with a list of potential payees, the payor may select from those other user devices in the vicinity. Display 300 may also include selectable options 304, which may be used to change the mode of the device between various transmission and receiving modes. For example, selectable options 304 may include options to place the device in "default" mode, "receive" mode, which are discussed above. Alternatively, the device can be placed into "direct mode," functionality of which is described in more detail below.

At step 108, the user may confirm an intent to provide payment to the selected payee, which may have been selected from the user devices that were determined to be within the vicinity of payor device 201.

Upon confirming the intended payee, at step 110, the user can input a desired payment amount and confirm intent to provide the payment as input to the payee selected. Payments made to payee devices may include an initial amount that pays for a product or service and a gratuity or donation amount that may be input by or selected by a user of payor device 201 when a transaction is processed. This payment amount may then be conveyed to a payment provider in step 112 of FIG. 1. Confirmation of payment can be sent to the payor and payee in step 114 in the manner determined by the user. Once the payment provider receives the payor amount confirmation in step 112, the payment provider may send payment confirmation to both the payor device and to the payee device in step 114. As such, step 114 may include receiving payment confirmation by payor device 201 after a transaction has been completed.

Payment processes can vary from peer to peer using payment data stored at least in part on a payor device or can use services such as Apple Pay, Google Pay, PayPal, cryptocurrencies, and so forth. QR codes or other images could be used between the devices such once a payee device is chosen and the parties and amount are identified, a QR code could be displayed on one device such that the second device can scan the code and a payment can be achieved. Near field communication (NFC) technology could also be used between the devices as well as other technologies.

Figure 4:
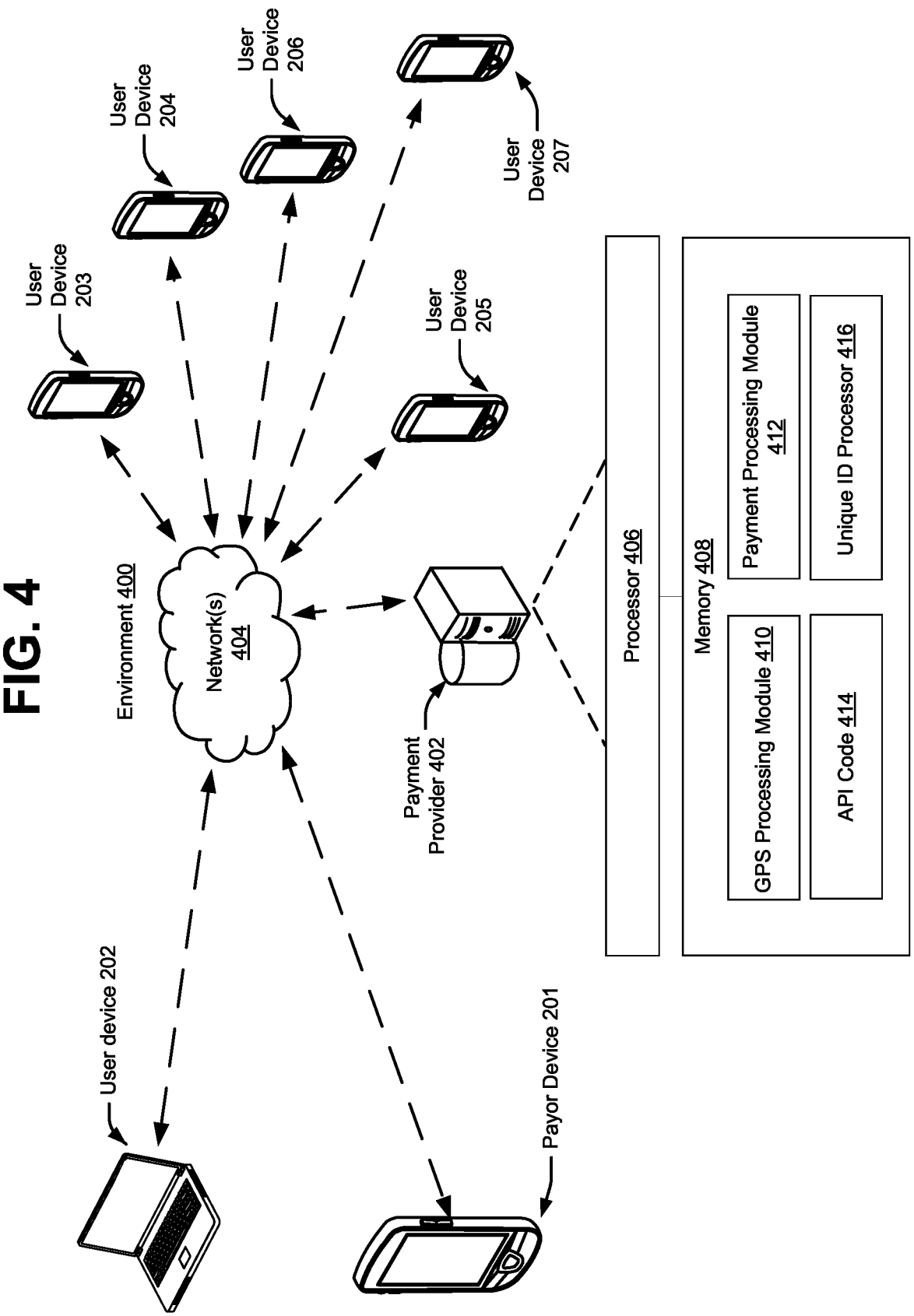
FIG. 4 illustrates an example environment illustrating a networked configuration of devices according to one payment processing embodiment consistent with the present disclosure.

FIG. 4 illustrates an example environment illustrating a networked configuration of devices according to one payment processing embodiment consistent with the present disclosure. FIG. 4 represents an example environment 400 depicting payor device 201, along with user devices 202-207, and a payment provider 402. The various devices may be communicatively coupled by way of network(s) 404, which may be the Internet, a cellular network, a peer to peer network, Bluetooth wireless protocol, NFC, or any other type of network, such as a LAN or WAN. While FIG. 4 depicts user devices 202-207 as all being connected to network(s) 404, user devices 206 and 207 may be located outside of the vicinity of payor device 201 and, therefore, are not included in the list of potential payees. Alternatively, user device 206 may be within a certain threshold proximity of payor device 201. The device 206 be included in the list of potential payees, but may be visually depicted in a different manner, as illustrated in FIG. 3, while user device 207 may not be included in the list, due to not being within the threshold distance of the proximity area In one aspect, only payee devices that have a particular application or function turned on for receiving payments can cause the respective payee device to be presented on the display of the payor device for potential selection. In certain instances payor devices and payee devices may share information via network 404 and/or payment provider 404 when payments are processed. Additionally or alternatively, payor devices may communicate directly with payee devices when payment amounts are identified and each of these devices may communicate with payment provider 402 when payments are identified and processed.

Payment provider 402 may include a processor 406 and a memory 408, which may store various software modules or components for execution by processor 406. For example, memory 408 may include a GPS processing module 410, which may perform processing of incoming GPS coordinates that are received from payor devices, and which may determine user devices that are within a threshold distance of the incoming GPS coordinates, such as by comparing to GPS coordinates associated with the user devices. Payment provider 402 may also include a payment processing module 412, which may provide functionality by which a payor or payee may register banking information with the system, and which may process incoming and outgoing requests for transfer of money. Payment provider 402 may further include API code 414, which may be utilized by external third-party software applications to provide additional functionality to the system, such as for integrating with money management software, in order to easily and efficiently store copies of receipts of transfers for a payor. Finally, payment provider 402 may include a unique ID processing module 416, which may be utilized to generate and provide unique identifiers to payor and payee devices for purposes of identification, as discussed in further detail below.

Additional features in the preceding embodiment may include the ability of the recipient or payee device, once selected by the payor as in FIG. 3, to provide a menu of items or services for sale for selection by the payor. The payor may then select a single or multiple items from the menu for purchase via a graphical user interface (GUI) at their payor device. This selection, once confirmed by the payor, would then be sent to the recipient/payee device for fulfilment directly or via a server. This feature may allow the participants to minimize verbal communication and reduce the need for engaging one another in close physical proximity. Such features may allow users to better comply with social distancing best practices in the event of a health security event.

In one embodiment, a visual confirmation, text or image, may be shown to both the payor and recipient for the purposes of confirming the identities of the participants engaging in a transaction. This content may be randomly selected by the server from a cache of images, other content generated by the server or may be an image known to either the payor or recipient. In each instance, payee devices and payor devices may each store copies of the visual confirmation of the transaction and/or the participants. Visual confirmation of the participants may include an image of the payor, the payee, or both. Such confirmations may also include images of the payor receiving one or more items that they selected from the menu. These images may also include features that are readily identifiable by a payor. For example, an image of logo of Domino's Pizza may be provided with the confirmation provided to the payor.

In one embodiment, the process flow is as follows. The payor on a payor device opens the application or uses/initiates an "App Clip" which is a downloaded piece of code from a server that is a portion of an application but that does not involve downloading the full application to the user. The payor views list of vendors/recipients that can be populated based, in one example, on other vendor devices within a threshold distance of the payor device. The payor can select via the user interface a vendor from the list. The payor then views a menu associated with the vendor. The payor selects one or more desired menu items. On the user interface, payor is presented with a total and the payor confirms a payment. Many different payment mechanisms such as Apple Pay (Safari or App version), Google Pay, PayPal, Amazon Pay, Facebook Pay, cryptocurrency payments, etc., can be utilized. The vendor receives order/payment confirmation and the vendor can confirm the order completion. Both the payor and the vendor can be presented with a unique image allowing mutual confirmation.

In another embodiment, a payor may place an order directly with a recipient, via phone or electronic means. When that order is ready for pickup or has been delivered, the payor may use the App to identify that specific order in a list of available orders. The payor may then select the item in a list that represents the payor's order. Once selected the payor may view the total cost of the ordered items and an option to transfer funds in that amount or an amount that may include a gratuity. Once any additional amounts are input, the payor may complete the transaction by confirming payment. The recipient could then receive confirmation of the payment for the order and any additional gratuity included.

Payments may be fulfilled by any payment system known in the art, including yet not limited to a credit card, a PayPal account, automated clearing house (ACH) payments, digital credits downloaded on particular devices, or by a digital crypto-currency payment processing system (via Bitcoin for example). Device settings may be used to identify account information and authorize identified accounts to provide or receive payments.

Alternative embodiments of the disclosed system can also be utilized to provide the ability to send a cashless payment between a payor device and a payee device. In one embodiment, instead of determining a plurality of payee devices in proximity to a payor device, the payor and payee devices may utilize a "direct receive/direct transfer" mode between the devices. For example, software executing on the payor device may request permission from the device operating system to access a camera associated with the device. The camera can then be used to scan an identifying code that may be associated with a payee device, such as by scanning a barcode or quick response (QR) code that may be displayed on a screen of the payee device.

In one embodiment, the barcode or QR code could be displayed when the payee device is set to a "direct receive" mode, and the payor device may access the camera when the payor device is set to a "direct transfer" mode. To protect identity information associated with the payee device, the barcode or QR code can be generated by, for example, the payment provider upon the device being set to "direct receive" mode, using a unique identifier generated by the payment provider. Upon scanning the barcode or QR code displayed on the payee device, the unique identifier generated by the payment provider and displayed on the payee device can be provided to the payment provider by the payor device, and the accounts associated with the payor and payee devices can be determined at the payment provider, keeping the account information secure. At this point, the payment provider may allow the payor device to select an appropriate amount to transfer to the payee device.

In another instance, a payor device and a payee device may communicate using radio or optical signals that are effective within a very short distance. For example, less than a few millimeters or centimeters. One example of short distance radio signals may be a form of near field communication (NFC) that may be electronically read/scanned by a user device instead of using a camera to scan a barcode or QR code. In such instances, order and payment information may be securely transmitted between the payor and payee devices only when those devices are within that very short effective communication distance, where additional communications between a payor device and a payee device may be transmitted by a low power radio or optical communication interface.

In another aspect, an NFC tag or other component, or a QR Code or other visual code could be used to initiate the retrieval of downloaded computer readable instructions. The tag, code or component can provide a URL which can be used to access a server to receive a user interface viewable in a browser or an "App Clip" that is a portion of an application that performs a specific task. The interactions and processes disclosed herein can be managed on one or both devices using this approach.

In another embodiment, payee devices may be configured to broadcast a notification that a device is in "receive" mode, such that any time a payor device moves within a threshold distance from the payee devices, a notification can be provided to the payor device providing a suggestion as to providing a payment to the payee devices. For example, in certain instances, a coffee shop may have one payee device set to receive cashless payments as gratuities, and upon entering the coffee shop, the payee device may provide a notification to any payor devices that are suitably configured to use the payment provider, with the notification providing the option to submit a gratuity using a selected transfer method if the user wishes. In such an instance, the threshold distance may be set to a very low value, such as one to two feet or a few centimeters, in an effort to avoid issuing notifications to payor devices that are not involved in the transaction occurring in the coffee shop.

Furthermore, the payment processor may be capable of verifying a particular payee device in combination with the individual or organization associated with the payee device. For example, in the coffee shop environment, the coffee shop may provide one or more verified payee devices for receiving gratuity payments. By having a verified payee device, customers can feel greater confidence in the security of submitting a payment to the device. Furthermore, as incentive for getting payees to verify their devices, when payor devices enter a particular environment (e.g., the coffee shop), verified payee devices may be assigned a priority position and may be displayed at the top of the listing of proximate payee devices via the user interface of the payor devices, regardless of whether a non-verified payee device is in closer proximity to the payor device.

In other instances, a payor device may use one type communication medium to pre-order an order for pickup and use a second type communication medium for verifying receipt of the order after which payments may be processed. For example, a payor device may send an order to purchase a burrito and a soda via a cellular communication connection and later when the payor device comes within a proximal distance to a payee device, the two devices may communicate with each other using Bluetooth or another type of short distance communications when the payer receives the order.

A program application or App may draw information from a device (geolocation—Bluetooth and/or GPS) for upload to a server accessible via a cloud connection or the Internet. With this information, the server identifies and then transmits a list of users in the immediate proximity to the user. The user may then confirm the identity of the intended payee(s). The selection of the payee and confirmation may then be communicated to the server and the funds may then transferred from the account of the payor to the payee to pay for an order. Such a server may be a computer of payment provider 402 of FIG. 4 or may be a computer that communicates with payment provider computer 402.

The App may allow for two modes: "default" and "receive." In default mode, payors devices may not be discoverable by payee devices, but may be able to search for discoverable/payee devices in their immediate vicinity.

A device with the App set to the default payor mode may query the server for a list of discoverable user devices in their immediate vicinity (e.g. <15 meters or any other distance). The server may confirm the location of the user device through geolocation and may identify whether that user device is in payor or payee mode. This process may require that the location of respective user devices be confirmed by data shared with the server, after which the server may send a message to a payor device that confirms that another device in proximity of the payor device is set to receive mode. This message may serve as a prompt that indicates that a potential link has been identified. This prompt may include a username and image that allows the user of the payee device to confirm the identity of their intended payee. Once the user certifies that the prompt matches the intended payee, the payor may select an amount of funds to transfer and communications from the payor device may reaffirm the intent of the payor device user to transfer that selected amount. An email receipt of the transaction may then be sent to both the payee device and the payor device.

Upon receipt of the transfer, the payee may elect to receive a confirmation notification from the range of notifications available to applications on the device (vibrate and/or audible). This feature is intended to provide value to hospitality workers who would prefer to keep their device hidden during a transfer such as bellmen and other hospitality workers.

When desired, no personal information is exchanged between payor and payee devices. Information exchanged between devices may include the GPS location at the time of the transfer and the applications unique user identification number (Note: this number is generated by the server and is typically not the same as a username).

The App allows users planning to receive funds to input employer identification number (EIN) data for the purposes of collecting donations for a non-profit organization (501c3). If a user account is linked with a confirmed 501c3 organization, the user will receive a badge telling other users that transfer to this account is considered tax-deductible. The App may compile a list of tax-deductible donations annually for tax purposes and this information may be used to provide funds or donations to any authorized charity, non-profit, church, or other organization.

Once a payor has identified a payee confirmed to be a 501c3, a recurring transfer could be established. This feature is intended to help users more easily give to churches and charities.

Areas with a significant number of users such as hotels and restaurants may elect to identify payees under a common identifier such as the hotel name. Users will have the choice to receive payments under a job category (bellman, housekeeping, doorman, concierge, etc.) allowing staff to split payments as desired. Users in a high-volume area may elect to identify with a particular business and job category allowing payors to more quickly sort through the list of payees in the area.

Information collected and functions performed by methods and apparatus consistent with the present disclosure may allow users or organizations to identify or collect types of authentication information, application permission information, user profile data, settings, account information, or payment rules. This information or settings may control types of data that may be provided to payor devices or payee devices or may control rules for distributing funds or notifications that may be sent to other user devices.

A server may require that a user device be coupled to user authentication and setting information that allows a user to login, change a password, or register for certain types of communications. User passwords may be permanent or they may be temporary one time passwords. User authentication may also include a dual factor authentication, for example a user may provide a password and then receive a personal identification number (PIN) sent to them by email or text. In such instances both the password and the PIN may be required to authenticate a user.

A user device may be configured to use certain types of location (e.g. GPS or close proximity—Bluetooth/other) tracking. Users may be requested to allow access to location information identified by a global positioning system (GPS) at their phone. Alternatively or additionally, a user may be required to enable other features that a processor at their phone would run as a background task.

Profile information may authorize the use of a camera that may acquire images used to confirm a transaction or may identify a type of code that a particular user device is configured to use when transactions are processed. Profile information may identify that a user must scan a quick response (QR) code or near field communication (NFC) chip located at a place of business of a payee when that user makes a purchase. Furthermore, profile information may identify individuals, specific businesses, or charities that they commonly purchase items or donate money to. Users may also be allowed to edit or update profile information, identify a specific payee as a 501C3 charity, or view the profile of other users. Donations made to charities may be persistently stored such that these donations could be deducted from a user's taxes.

A user may also be allowed to make settings that further refine or that identify user preferences. The process of entering settings may include a special setup mode. Settings may be used to identify whether a device is a payor device or a payee device. Some users may use their settings to switch between a payor mode and a payee mode. Users may be allowed to identify an account, to add funds to an account, or to add a form of digital currency to their mobile device. This would allow parents to load small amounts of funds to their child's phone to limit how much their child could spend. Users may be prompted to review and accept terms and conditions of making purchases or when an account reaches a certain minimum balance.

Settings may also be used to identify a proximity or zone within which payee devices could be identified. For example, a user may specify that they only wish to interact with payee devices within a few feet, a few hundred feet, or within a few miles. Settings may also be used to identify a set of rules for processing transactions. For example, when user John is at a hotel and an attendant David carries his bags to his room, a mobile device belonging to the attendant David may be identified in a display of John's phone. John could then make a selection, view David's profile information, confirm David's identity, and transfer funds to an account belonging to David as a tip. David's phone may then be sent a push notification informing him that John sent him a five dollar tip. In instances when David does not have a payment application installed on their phone, John may suggest that David download the payment application to receive a tip.

Settings could also be used to identify repeating payments. For example, a payment of ten dollars could be sent to a Church every Sunday or payments could be made to a bank to pay off a car loan every month for a span of three years.

Notifications could be sent to user devices when funds are transferred to or from an account. Notifications could also be sent when an account is low on funds or notifications could provide suggestions regarding how best to manage an account. Such suggestions could recommend that an account be automatically refilled from another account whenever an account reaches a minimum balance or suggestions could recommend limiting how frequently an account should be refilled.

Payment applications downloaded to a user device may also provide tailored reporting functions that allow payees or payors to filter, sort, or view specific information. Payee devices may be configured to display a list of funds that they have received. This list could also identify when and where each transaction occurred. Payor devices may be configured to provide similar information. For example, a payor device may be configured to display all purchases made by a user. User devices may be configured to display transaction information without identifying the entities involved in the transaction or these devices may be configured to display information that identifies only certain types of entities. As such, a user device could be configured only to identify entities that were a 501c3 charity.

Figure 5:
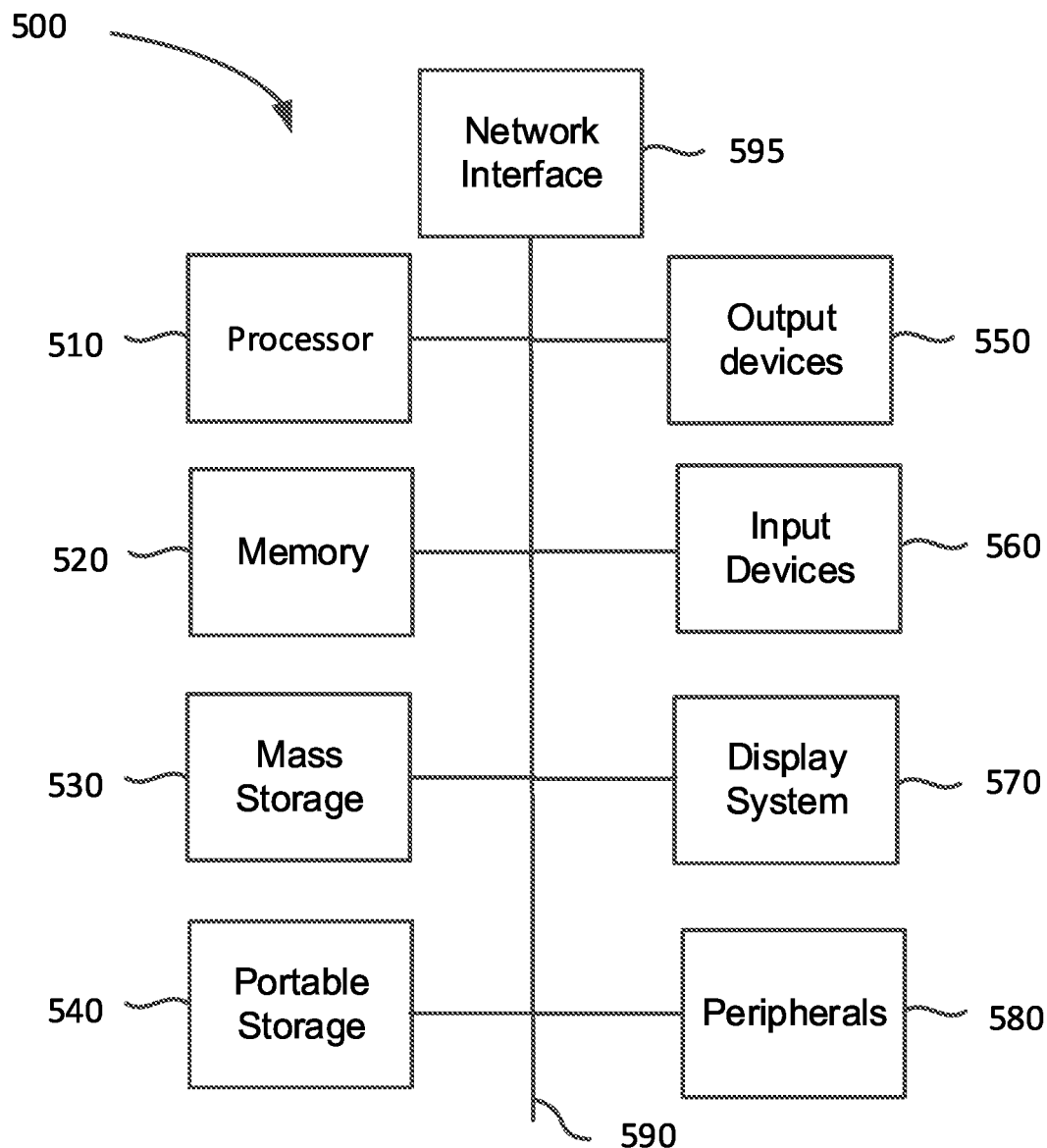
FIG. 5 illustrates a computing system that may be used to implement an embodiment of the present invention.

FIG. 5 illustrates a computing system that may be used to implement an embodiment of the present invention. The computing system 500 of FIG. 5 includes one or more processors 510 and main memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, peripheral devices 580, and network interface 595.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a FLASH memory, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

Network interface 595 may include any form of computer interface of a computer, whether that be a wired network or a wireless interface. As such, network interface 595 may be an Ethernet network interface, a BlueTooth™ wireless interface, an 802.11 interface, or a cellular phone interface.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 500 may in some cases be a virtual computer system executed by another computer system. Various operating systems can be used including Unix, Linux, Windows, Macintosh OS, Palm OS, Android, iOS, and other suitable operating systems.

User interfaces can include speech, texting, graphical user interfaces, multi-modal interfaces, button pressing, biometric input such as fingerprint or faceprint ID data, or a combination of different inputs including different types of inputs to achieve the functionality disclosed herein.

The concepts disclosed herein may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

What is claimed is:

1. A computer-implemented method comprising:
    comparing, by a processor of a payment provider, GPS coordinates between a received GPS-based location of a first user device and GPS-based locations of a plurality of user devices to identify a subset of one or more user devices within a threshold proximity distance of the first user device;
    delivering, by the processor, to the first user device, data that identifies the one or more user devices in the subset of user devices and a user interface that displays the data on the first user device, wherein the user interface displays the subset of one or more user devices in a sequence that is ranked based on a proximity of each of the subset of one or more user devices ranked from nearest to furthest to the first user device, and ranked based on a popularity criteria associated with prior payments received by each of the subset of one or more user devices from other payors; and
    initiating and authorizing, by the processor, an electronic payment corresponding to a desired electronic transaction defined by a confirmation of a selected payee device from among the subset of the one or more user devices, the electronic payment initiating a transfer from an account associated with the first user device to an account associated with the selected payee device.

2. The computer-implemented method of claim 1, wherein the first user device has stored thereon an application executing in a default payor mode.

3. The computer-implemented method of claim 1, further comprising:
    requesting and receiving, by the processor, from the plurality of user devices other than the first user device, a GPS-based location of each of the plurality of user devices other than the first user device, the plurality of user devices other than the first user device each executing an instance of a respective instance of an application operating in a receiving payee mode.

4. The computer-implemented method of claim 1, further comprising:
    receiving, by the processor, from the first user device, (i) a selection of a payee device from among the one or more user devices, (ii) a numerical value corresponding to the desired electronic transaction between the first user device and the selected payee device; and (iii) the confirmation of the selected payee device and the numerical value.

5. The computer-implemented method of claim 2, further comprising:
    delivering, by the processor, to the first user device, a user element or icon that switches an application between the default payor mode and a receiving payee mode.

6. The computer-implemented method of claim 2, further comprising:
    receiving, by the processor, a user interaction setting an application on the first user device into the default payor mode that configures the first user device as a payor device to authorize payments.

7. The computer-implemented method of claim 1, further comprising:
    receiving, by the processor, a user interaction setting an application on the first user device into a receiving payee mode that authorizes an account of the first user device to receive payments.

8. The computer-implemented method of claim 1, further comprising:
    receiving, by the processor, signals transmitted over the threshold proximity distance from the one or more user devices, wherein an identification of the one or more user devices within the threshold proximity distance of first user device as a payor device is based on the payor device receiving the signals transmitted from the one or more user devices.

9. The computer-implemented method of claim 1, further comprising:
sending, by the processor, an order for a product or service from the first user device via a first type of communication interface of the first user device to the selected payee device, wherein a message is sent from the first user device via a second type of communication interface that authorizes the electronic payment from an account associated with the first user device.

10. The computer-implemented method of claim 1, further comprising:
receiving, by the processor, an order for a product or service from the first user device; and
receiving, by the processor, a message from the first user device that instructs authorization of electronic payment.

11. The computer-implemented method of claim 1, further comprising:
receiving, by the processor, from the selected payee device, a cost for a product or service associated with an order made by the first user device;
receiving, by the processor, from the selected payee device, a gratuity amount to add to the cost, wherein the electronic payment corresponds to an amount of funds equal to the cost plus the gratuity amount; and
receiving, by the processor, a message from the first user device that instructs authorization of the electronic payment.

12. The computer-implemented method of claim 1, further comprising:
receiving, by the processor, from the first user device, a future payment amount to provide to an account of the selected payee device, wherein an amount of an authorized payment equals a payment amount.

13. The computer-implemented method of claim 12, further comprising:
receiving, by the processor, from the first user device, scheduling information that identifies a schedule for paying the future payment amount at a future time;
identifying, by the processor, that the future time is equal to a current time; and
authorizing, by the processor, the electronic payment of the future payment amount to be paid according to the scheduling information based on the future time equaling the current time.

14. A non-transitory computer-readable storage medium storing instructions which, when executed by a processor of a server of a payment provider, cause the processor to perform operations comprising:
comparing GPS coordinates between a received GPS-based location of a first user device and GPS-based locations of a plurality of user devices to identify a subset of one or more user devices within a threshold proximity distance of the first user device;
delivering to the first user device, data that identifies the one or more user devices in the subset of user devices and a user interface that displays the data on the first user device, wherein the user interface displays the subset of one or more user devices in a sequence that is ranked based on a proximity of each of the subset of one or more user devices ranked from nearest to furthest to the first user device, and ranked based on a popularity criteria associated with prior payments received by each of the subset of one or more user devices from other payors; and
initiating and authorizing an electronic payment corresponding to a desired electronic transaction defined by a confirmation of a selected payee device from among the subset of the one or more user devices, the electronic payment initiating a transfer from an account associated with the first user device to an account associated with the selected payee device.

15. The non-transitory computer-readable storage medium of claim 14, wherein the first user device has stored thereon an application executing in a default payor mode.

16. The non-transitory computer-readable storage medium of claim 15, wherein the non-transitory computer-readable storage medium stores additional instructions which, when executed by the processor, cause the processor to perform operations further comprising:
requesting and receiving, by the processor, from the plurality of user devices other than the first user device, a GPS-based location of each of the plurality of user devices other than the first user device, the plurality of user devices other than the first user device each executing an instance of a respective instance of an application operating in a receiving payee mode.

17. The non-transitory computer-readable storage medium of claim 15, wherein the non-transitory computer-readable storage medium stores additional instructions which, when executed by the processor, cause the processor to perform operations further comprising:
delivering to the first user device, a user element or icon that switches an application between the default payor mode and a receiving payee mode.

18. A server of a payment provider comprising:
a memory; and
a processor that executes instructions stored in the memory to perform operations comprising:
comparing GPS coordinates between a received GPS-based location of a first user device and GPS-based locations of a plurality of user devices to identify a subset of one or more user devices within a threshold proximity distance of the first user device;
delivering to the first user device, data that identifies the one or more user devices in the subset of user devices and a user interface that displays the data on the first user device, wherein the user interface displays the subset of one or more user devices in a sequence that is ranked based on a proximity of each of the subset of one or more user devices ranked from nearest to furthest to the first user device, and ranked based on a popularity criteria associated with prior payments received by each of the subset of one or more user devices from other payors; and
initiating and authorizing an electronic payment corresponding to a desired electronic transaction defined by a confirmation of a selected payee device from among the subset of the one or more user devices, the electronic payment initiating a transfer from an account associated with the first user device to an account associated with the selected payee device.

19. The server of the payment provider of claim 18, wherein the first user device has stored thereon an application executing in a default payer mode.

20. The server of the payment provider of claim 18, further comprising:
a first type of communication interface that receives an order for a product or service from the first user device; and a second type of communication interface, wherein a message is sent from the first user device via the second type of communication interface that authorizes the electronic payment from an account associated with the first user device.

\* \* \* \* \*